United States Patent
Cheatham et al.

[11] Patent Number: 5,547,142
[45] Date of Patent: Aug. 20, 1996

[54] TAPE CASSETTE WITH INTERNAL TAPE CLEANING AND LOCKING

[75] Inventors: Samuel D. Cheatham, Golden; Lynn C. Jacobs, Louisville; Donovan M. Janssen, Boulder; Michael L. Leonhardt, Longmont; Charles A. Milligan, Golden; Christian A. Todd, Denver, all of Colo.

[73] Assignee: Storage Technology Corporation, Louisville, Colo.

[21] Appl. No.: 367,513

[22] Filed: Dec. 30, 1994

[51] Int. Cl.$^6$ ................................................ G11B 23/087
[52] U.S. Cl. ...................... 242/338.1; 242/343; 242/346
[58] Field of Search ............................ 242/336, 338, 242/338.1, 338.2, 341, 343, 345, 346, 346.1, 347, 347.1; 360/132

[56] References Cited

U.S. PATENT DOCUMENTS

| | | | |
|---|---|---|---|
| 4,334,656 | 6/1982 | Crawford et al. | 226/92 |
| 4,335,858 | 6/1982 | Cranna | 226/91 |
| 4,383,660 | 5/1983 | Richard et al. | 360/95 |
| 4,452,406 | 6/1984 | Richard | 360/95 |
| 4,614,270 | 9/1986 | Oishi | 242/347.1 |
| 4,920,439 | 4/1990 | Bordignon | 242/346 |
| 4,949,914 | 8/1990 | Barton, Jr. | 360/95 |
| 4,984,119 | 1/1991 | Backlund et al. | 360/132 |
| 5,019,933 | 5/1991 | Karsh | 360/132 |
| 5,218,501 | 6/1993 | Sellke | 360/130.21 |
| 5,294,072 | 3/1994 | East et al. | . |
| 5,297,754 | 3/1994 | Albrecht et al. | . |

FOREIGN PATENT DOCUMENTS 60-214486  10/1985  Japan ..................................... 360/132

*Primary Examiner*—John P. Darling
*Attorney, Agent, or Firm*—Timothy R. Schulte

[57] ABSTRACT

A cassette for a high performance tape drive is disclosed. A cassette shell having the same general external dimensions as an industry standard leader block tape cartridge (3480/3490) includes both a tape supply spool and a take-up spool. Two tape guides present a segment of tape to a cassette access port which can be closed by a sliding door to prevent contamination when the tape is not in use. A tape cleaning device and a spool locking device are incorporated into the cassette mechanism.

5 Claims, 8 Drawing Sheets

TAPE CASSETTE WITH INTERNAL TAPE CLEANING AND LOCKING

FIELD OF THE INVENTION

The present invention relates generally to tape recording generally associated with digital computer data storage and, more specifically, to a tape cassette having a stable head-to-tape interface and self-contained cleaning and locking devices.

BACKGROUND OF THE INVENTION

Recording tape is a known medium for the storage of audio, video, and computer data. In the field of computer data recording (that is, the writing, or storing, of analog or digital data onto tape and the reading, or retrieving, of written data from tape), perhaps the most important feature of tape transport and recording equipment design is the interface between the tape and recording head interface. At the interface, well-controlled, intimate contact between the head and tape is essential to achieve high quality recording performance. Critical to this contact is smooth, clean, consistently tensioned and aligned tape over the full range of tape operating motion. Mechanical misalignments, tape deformation, and foreign debris degrade the interface quality and reduce performance.

Tape cartridges (generally defined as having one internal spool of tape) and cassettes (generally defined as having a tape supply spool and take-up spool internal to the device) provide for physical protection of the recording medium—typically magnetic tape—during storage, handling, and operations in the recording equipment. Cartridges and cassettes provide for a much improved protection over earlier open reel tape carrier designs. Cassettes typically include some form of internal tape guiding mechanism.

There are many commercial magnetic tape recording cartridges and cassettes, using tapes of various cross-width dimensions (for example, 4 mm, ¼-inch, 8 mm, ½-inch, and 19 mm), currently used for storage and retrieval of digital data. Since its introduction in the 1950's, half-inch magnetic tape has been particularly a vital part of data processing. In current technology, a magnetic tape cartridge using half-inch magnetic tape for storing digital data is defined in American National Standard Institute's (ANSI) proposed standard X3-180-1990. This cartridge (popularly known as the "3480/3490" cartridge) contains a single reel of magnetic tape, including a leader block for interfacing with an automated threading subsystem of an adapted tape drive (referred to hereafter as the "leader block tape cartridge"). This leader block tape cartridge is fuller illustrated and described in U.S. Pat. No. 4,383,660, and 4,452,406. Tape transport drives using the leader block tape cartridge require a mechanism for extracting the leader block, threading the tape around a tape recording path and into a take-up reel in the drive, and, in reversing this process, to re-insert the leader block back into the cartridge after rewinding. This "loading mechanism" adds, size, complexity, cost and undesirable latencies to the tape transport. Further, the transport must contain a take-up reel and all of the necessary tape guiding and alignment features to support a stable, effective tape-head interface. In addition, the mechanism must meet the requirement of handling the tape gently yet rapidly; tape handling is a limiting performance factor. In general, type of cartridge and transport combination has the disadvantage of requiring a relatively long, external tape path to accommodate the required tape guiding and alignment features and the take-up reel. Moreover, the tape must always be fully rewound back into the cartridge before the cartridge can be removed from the transport. The complexity of such mechanisms is demonstrated, for example, in U.S. Pat. Nos. 4,334,656 and 4,335,858. Tape guide devices for leader block cartridge use are also complex; see e.g., U.S. Pat. No. 5,218,501 (Sellke). Similarly, mechanisms for re-insertion of the leader block are also complicated; see e.g., U.S. Pat. No. 4,949,914 (itself citing to many other patents in the field).

Technical advances have brought about thinner and stronger tape substrates that greatly increase the quantity of tape that can be contained in any given cartridge or cassette. Advanced recording strata on these substrates allow for much smaller recorded data bits. These enhanced recording densities are supported by advanced read and write head mechanisms that support higher track densities as well. The effective application of all these technical advances requires improved tape-to-head interface and tape handling by the transport.

Therefore, there is a need for a magnetic tape cassette which takes advantage of improvements in magnetic tape and read-write head technology and at the same time minimizes the need for drive mounted tape guiding elements, long tape paths, and a separate take-up reel and loader mechanism.

For many years both disk drives and tape drives have been manufactured according to a de facto size standard which requires that they fit within a physical envelope measuring 3¼ inches in height by 5¾ inches in width by 8 inches in depth, known in the industry as the 5¼ inch, half-height, form factor. In addition, cassette and cartridge handling systems have been developed so that libraries with automated tape handling have become a successful reality. Therefore, there is a need for a magnetic tape cassette that is compatible with industry standard form factors and automated tape handling systems.

SUMMARY OF THE INVENTION

In its basic aspects, the present invention provides a recording tape cassette apparatus, having a shell enclosing a central cavity, including a door-access for providing access to said cavity and adapted for receiving a recording head means therein. A tape supply spool, a tape take-up spool, a supply of recording tape coupled at each end to a spool, and spool drive associated with each said spool for coupling said spools to a tape transport mechanism are provided. Tape guides are mounted within said cavity for guiding a segment of the recording tape passed said door access in a predetermined alignment with the recording head. A locking mechanism is mounted within said cavity, for selectively locking and unlocking said supply spool and said take-up spool. A cleaning mechanism is mounted within said cavity for cleaning said tape as it is wound between said supply spool and said take-up spool.

It is an advantage of the present invention that it has a size compatible with industry standard tape drives and automated tape library systems.

It is an advantage of the present invention that it provides a self-contained take-up reel and thereby eliminates the need for a long tape path and complex threading mechanism associated with leader block cartridges to stabilize tape travel across a read-write head.

It is another advantage of the present invention that is provides a shuttered tape housing that keeps contaminants away from the tape.

It is another advantage of the present invention that is keeps the tape essentially free of contaminants at the tape-to-head interface, particularly when the tape is at a mid-position.

It is another advantage of the present invention that it provides self-contained tape cleaning capability.

It is yet another advantage of the present invention that it provides internal tape guiding and stabilization of tape position, particularly important in track following head transports.

It is a further advantage of the present invention that wear on spool locking devices is substantially eliminated.

It is a further advantage of the present invention that it provides a tape cassette conformed to industry standard form factors.

It is still another advantage of the present invention that it provides a tape cassette compatible with automated tape handling systems.

Other objects, features and advantages of the present invention will become apparent upon consideration of the following detailed description and the accompanying drawings, in which like reference designations represent like features throughout the FIGURES.

DESCRIPTION OF THE DRAWINGS

FIG. 4 is a perspective view (top) of the present invention as shown in FIG. 1 with the shell casing top half removed and the sliding door feature on.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable. While the invention is described in terms of magnetic tape recording, it will be recognized by a person skilled in the art that the invention is applicable to other technologies such as optical tape recording and the like. No limitation on the scope of the invention is intended by the use of this exemplary embodiment nor should any be implied.

Figure 1:
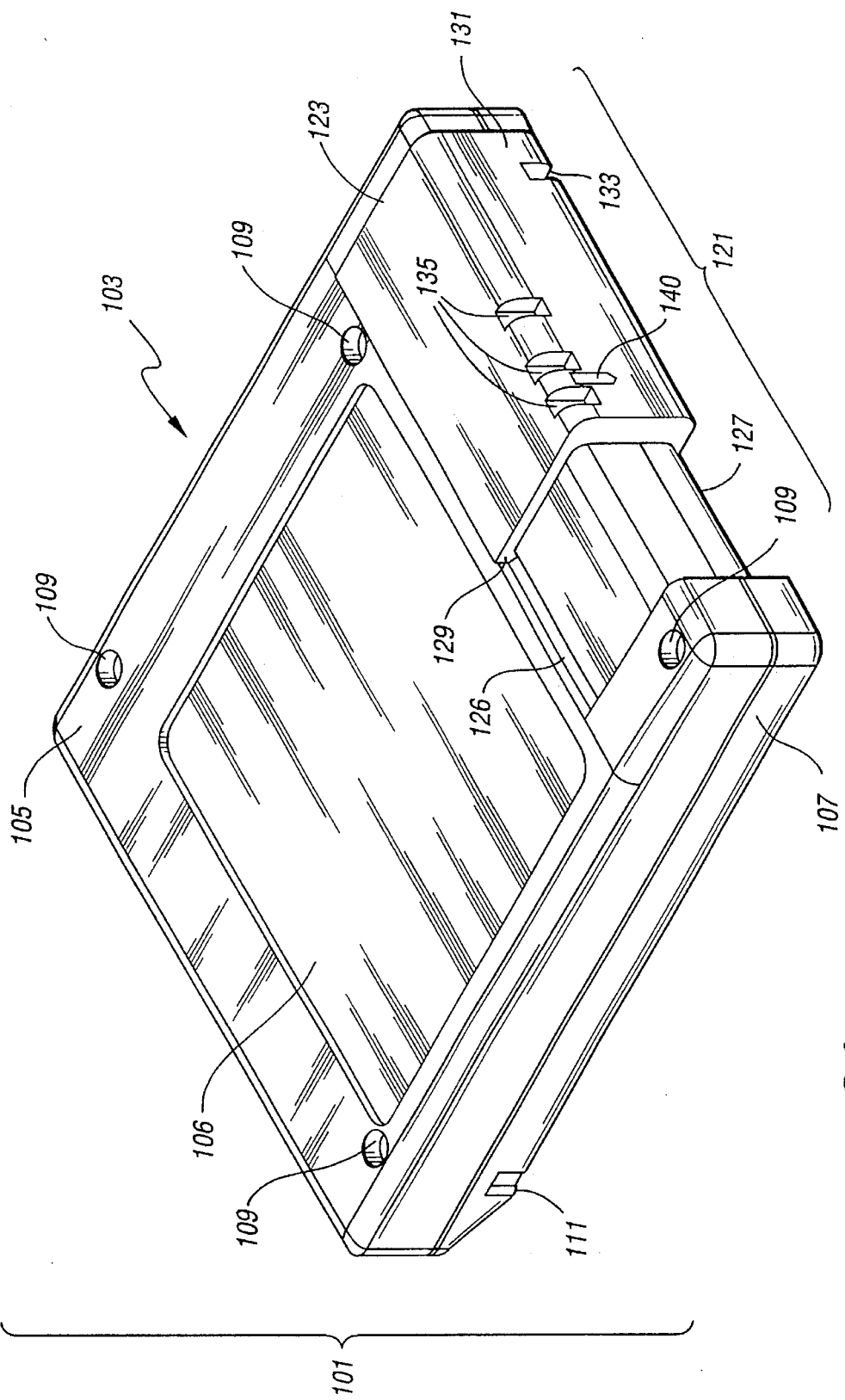
FIG. 1 is a perspective view (top) of the present invention, showing a sliding door feature in its closed position.

A tape cassette 101 in accordance with the present invention is shown in FIG. 1. The cassette 101 is generally a box-like shell 103, manufactured for convenience of assembly in two pieces 105, 107. While orientation is relative (that is, most tape drives are designed to operate regardless of the orientation to the local horizon), to facilitate description of the present invention the two pieces shall be arbitrary designated as the shell "top" 105 and the shell "bottom" 107. The shell top 105 and shell bottom 107 are designed to form a central cavity between them. In order to promote usability, the assembled shell 103 has an external shape and dimensions that make the cassette 101 compatible with manual and automated tape library systems designed for the aforementioned leader block tape cartridge. A shell top region 106 forming a slight depression is provided for conveniently applying manufacturing labels on the exterior of the cassette 101 so as not to interfere with handling, particularly in automated handling.

Recesses 109 are provided for fasteners (not shown) to affix the shell top 105 and the shell bottom 107 together. It will be recognized that shell halves can be connected in any manner, for example, bonding or welding techniques, as is commonly known in the art. In the preferred embodiment, the two shell pieces 105, 107 are held together by screws or other releasable fasteners. In the event of a cassette mechanism failure, the shell 103 may be opened and the tape contained therein (as described hereinafter) removed for data recovery processing. The shell 103 is provided with boss detents 111 for properly aligning the cassette 101 upon insertion into a compatible tape drive system (not shown). Additionally, referring to FIGS. 4, 6, and 7, in order to stiffen the cassette structure (particularly important for automated cassette handling systems), several support pillars 137 are fixedly mounted (or integrally molded if the cassette is a plastic part) within the shell central cavity in a spaced configuration designed to maximize cassette strength. The support pillars 137 can be sized to span the central cavity, or designed in matching half-pillars appropriately positioned in the shell top 105 to abut half-pillars in the shell bottom 107.

Figure 2:
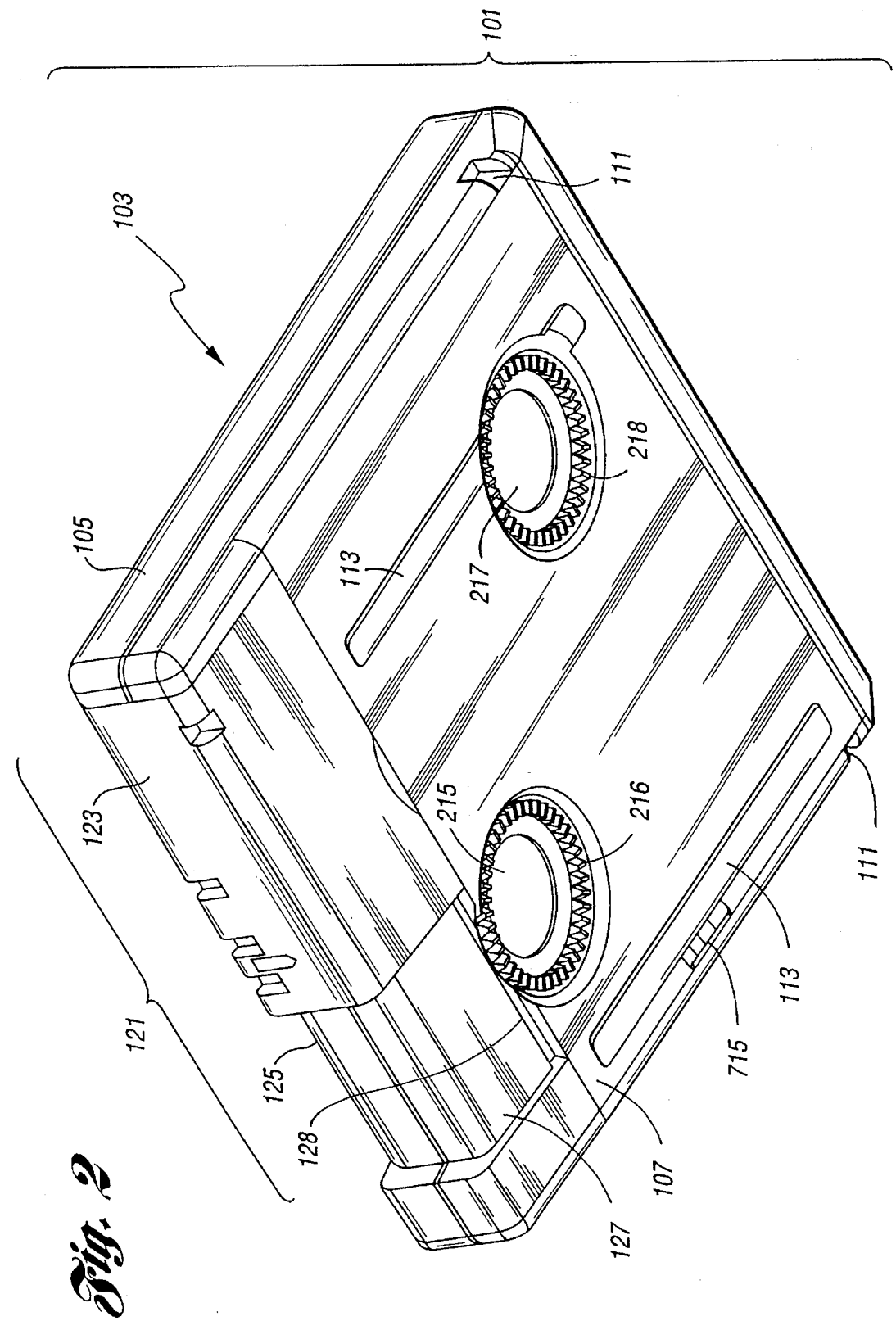
FIG. 2 is another perspective view (bottom) of the present invention as shown in FIG. 1.

Referring to FIG. 2, the cassette 101 is shown from a perspective in which the shell bottom 107 features are more clearly distinguished. Rails 113 are provided for assisting proper insertion of the cassette 101 into a library transport system. The rails 113 are positioned so as to be complementary to shell region 106 in a mating/fashion adapted to automated tape handling systems. Tape spool wells 215, 217 through the shell bottom 107 provide accesses to tape spool drive gears 216, 218, typically integrated with tape spool structures as would be known in the art.

Figure 3:
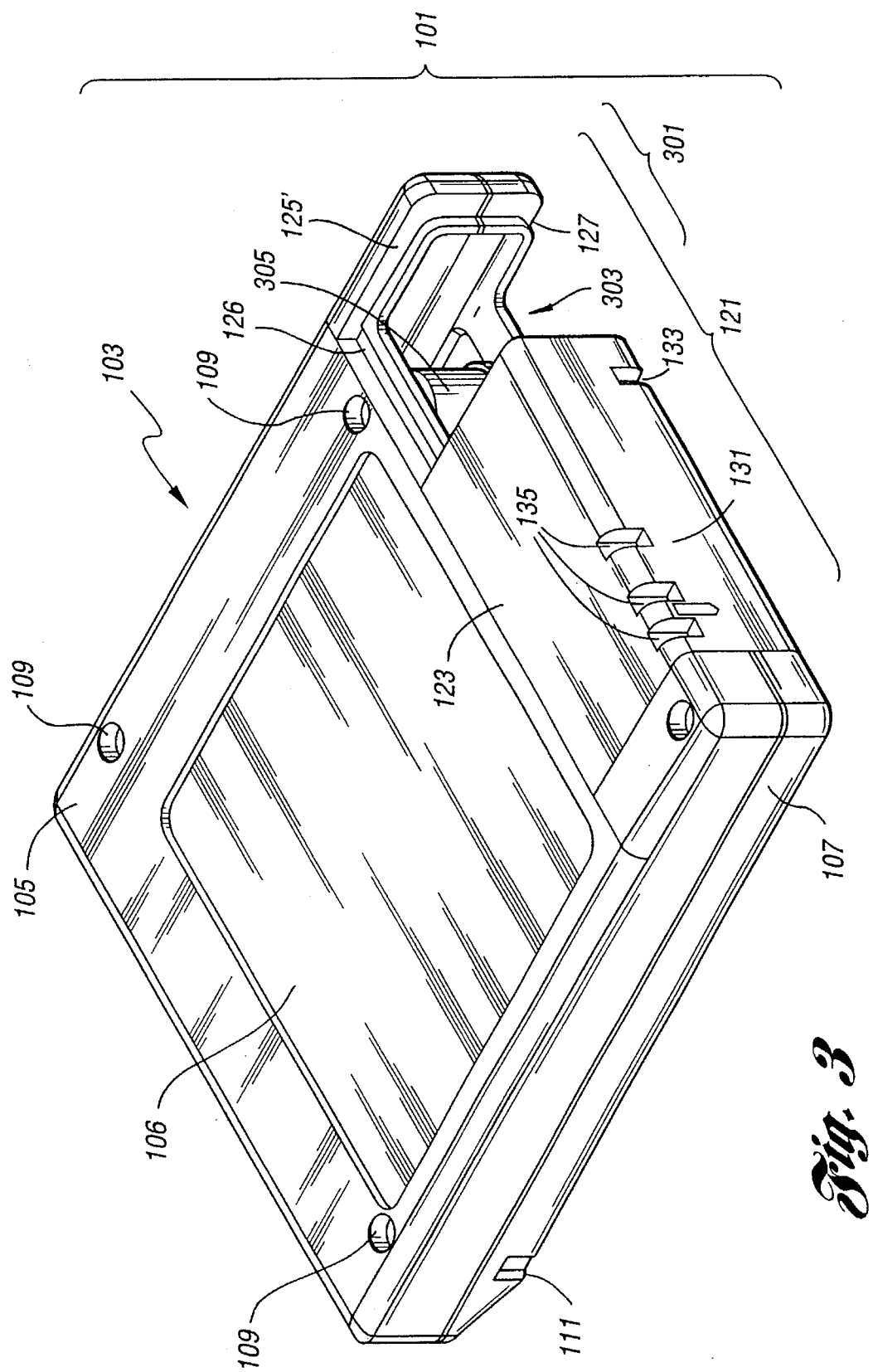
FIG. 3 is a perspective view (top) of the present invention as shown in FIG. 1, showing the sliding door feature in an open position.

In accordance with the present invention, no external tape path is used to create a tape-to-head interface. That is, a recording head (not shown) of the tape drive system is inserted into the cassette 101 and into contact with a segment of magnetic tape contained therein (as described hereinafter) in order to write to or read from the tape. The magnetic tape to recording head interface is sensitive to contamination. Dust, wear particles, and like contaminants can interfere with the interface, causing a degradation in performance and physical damage to the relatively compliant tape material. Moreover, such contaminants contribute to head wear. Therefore, it is advantageous to maintain the tape within a compartment that is guarded from contaminants, particularly during non-operational handling. It has been found that a sliding door mechanism 121 as shown in FIGS. 1, 2 and 3 best serves the accomplishment of this function.

In FIGS. 1 and 2, the sliding door 123 is shown in its closed position; that is, the position that the door 123 would normally be in when the cassette 101 is not fully inserted into a compatible tape drive transport. The shell top 105 and shell bottom 107 are provided with adjacent recessed portions 125, 127, respectively, at one end thereof, customarily the end which will be first inserted into the tape drive system in which the cassette 101 is to be used. Thus, when the shell top 105 and shell bottom 107 are assembled, the recessed end has a circumferential recess generally defining a U-shape. Each recessed portion 125, 127 includes an inner groove 126, 128, respectively, that is slightly deeper than the recess portions 125, 127 with respect to the shell top 105 and shell bottom 107. Referring now to FIG. 3 (see also FIGS. 5, 6 and 7), each of the recessed portions 125, 127 include a complementary cutout section 301 which forms an access port 303 into the shell central cavity at one end of the recess. At the access port 303 end of the recessed region of the shell 103, the recessed portions are basically flanges 125', 127' that protrude from the shell a distance just sufficient to receive the sliding door 123 around them.

In turn, the sliding door 123 is designed with a U-shape conforming to the outer circumferential area of the recessed portions 125, 127 to be received in a non-interference manner about the recessed portions 125, 127. The tips of the U-shaped sliding door 123 include inwardly protruding portions 129 designed to snap-fit into the inner grooves 126, 128 of each recessed portion 125, 127. The fit between the sliding door 123 and the recess in the assembled shell 103 is designed to be sufficiently secure enough to inhibit the entrance of contaminants while allowing a relatively free sliding movement between the door 123 in its closed position as shown in FIGS. 1 and 2 and its open position as shown in FIG. 3.

The width and range of travel of the sliding door 123 is designed to be sufficient to open a shell access port 303 to receive a magnetic recording head into the shell when the door 123 is open and to secure the central cavity of the shell from undesirable contamination when the door 123 is closed. This is generally achieved by the sliding door 123 having a width greater than the cutout section 301. The door face 131 is provided with an appropriate catch 133 for mating with a compatible door moving mechanism (not shown) of the tape drive system.

That is, upon complete insertion of the cassette 101 into a compatible drive, the catch 133 is used to slide the door 123 to the open position to allow recording head access. With the sliding door 123 open as shown in FIG. 3, a segment 305 of the tape medium is exposed and a recording head can be inserted into the cassette 101 to interface with the tape as it is reeled from one spool to the other.

Additionally, the sliding door is also provided with tape identification sensor depressions 135 (in accordance with ANSI standard proposal for a 6-pin media identification). This feature is incorporated so that the cassette 101 may be identified when it is inserted. That is, when inserted into a compatible tape drive transport, the sliding door 123 will be opened and the media identification code read for verification. A write protect indicator 140 as is known in the art is also provided.

Figure 4:
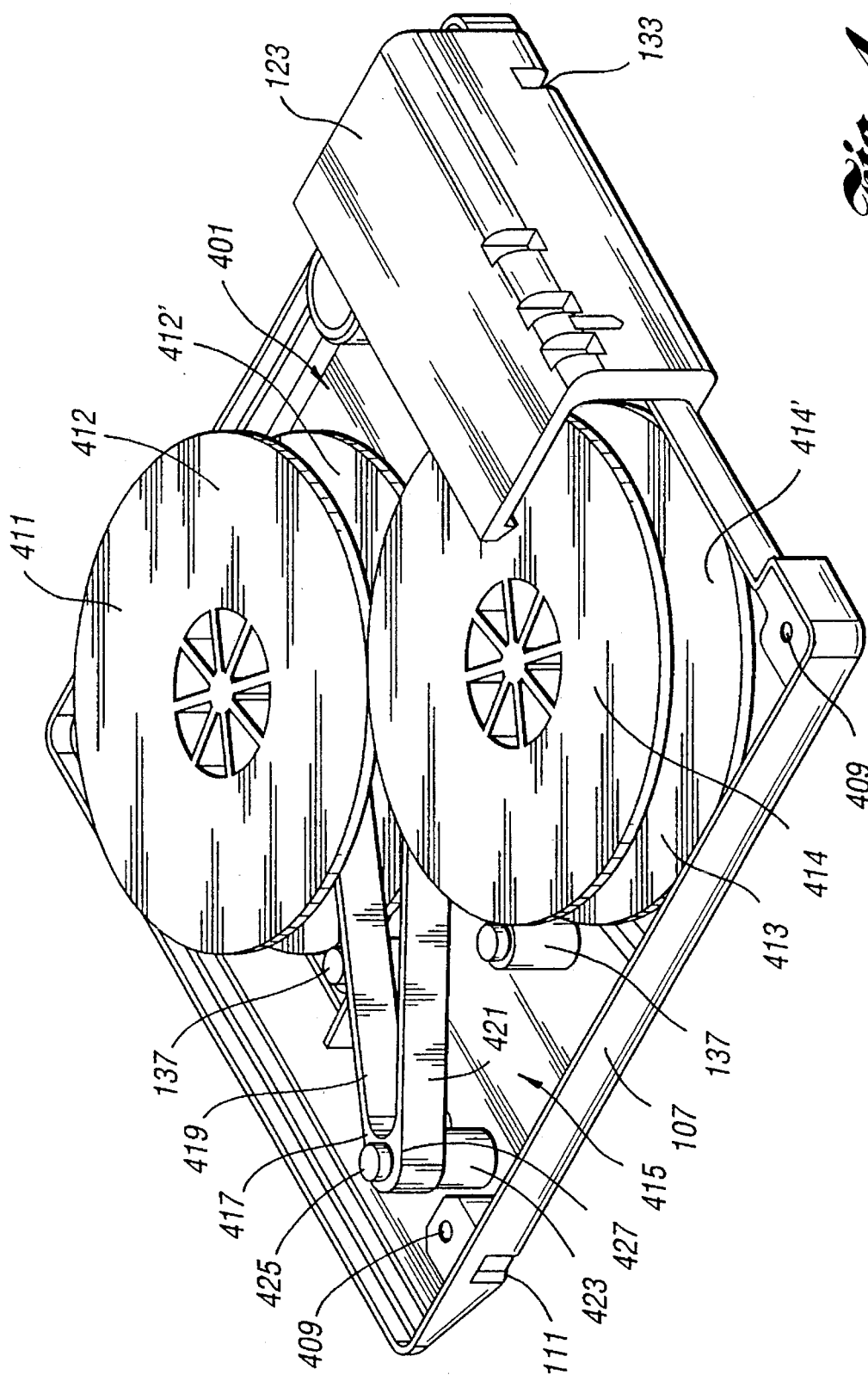

The cassette 101 is shown in FIG. 4 with the shell top 105 removed and the sliding door 123 replaced to indicate the relative position of the internal mechanisms of the cassette to the door 123 in its closed position. The shell central cavity 401 is formed in half by the box-like shape of the shell bottom 107. Fastener anchorages 409 are provided, suitably aligned with the recesses 109 of the shell top 105. Two tape spools 411, 413 (depicted empty) are adapted to fit within the confines of the central cavity 401 for non-interfering rotation about respective center axes. Each spool 411, 413 has an upper and lower flange 412, 412', 414, 414', respectively, for properly wrapping the tape around the spool. Each spool 411, 413 is designed to fit and cooperate within the central cavity 401 with tape spool drive gears 216, 218 (FIG. 2) accessible through the tape wells 215, 217 of the shell bottom 107. In this manner, when inserted into a tape drive system, the spool drive gears 216, 218 can be operatively coupled to tape transport mechanisms of the tape drive system.

Figure 5:
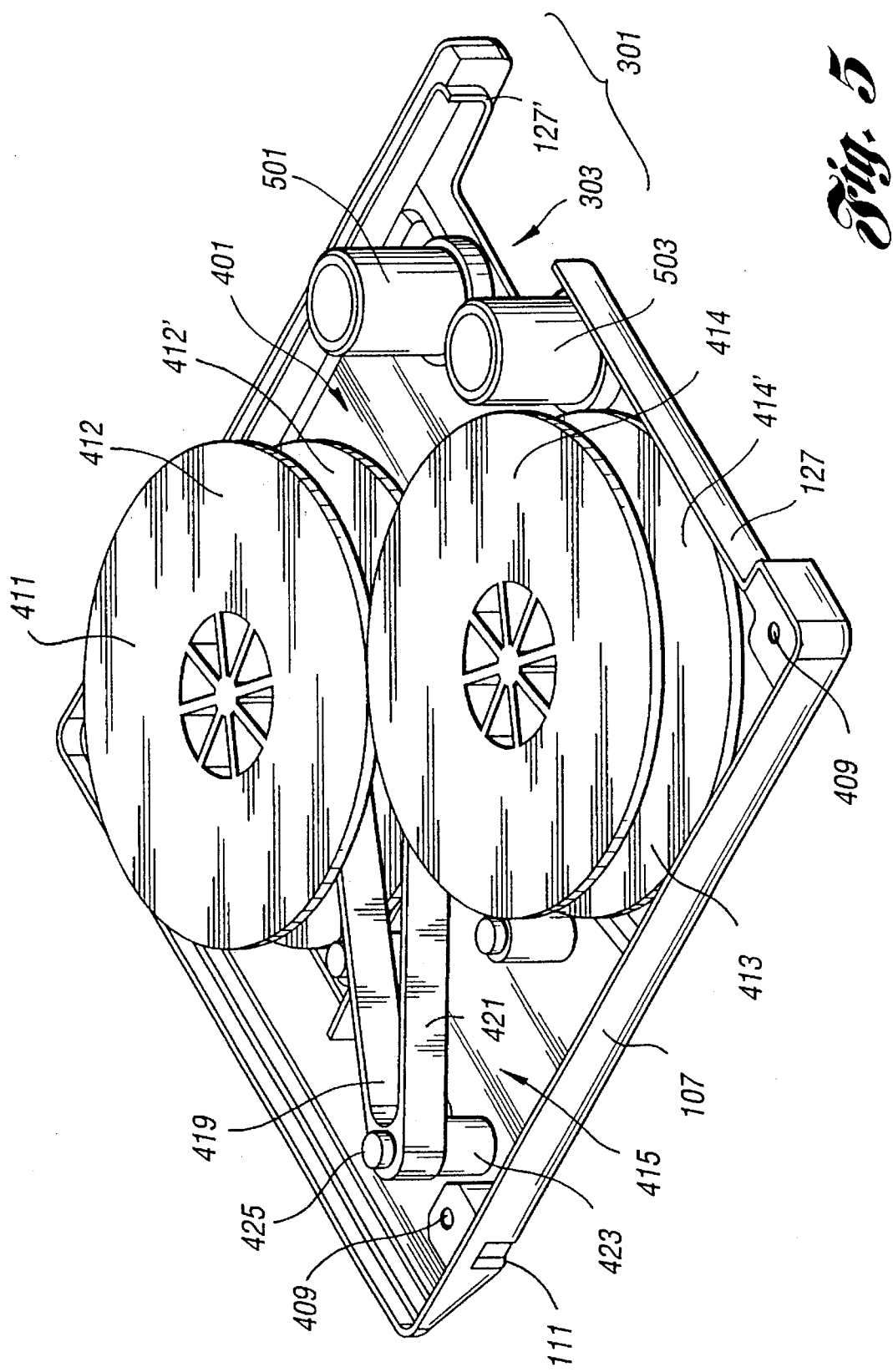
FIG. 5 is a perspective view (top) of the present invention as shown in FIG. 4 with the sliding door feature removed.
Figure 6:
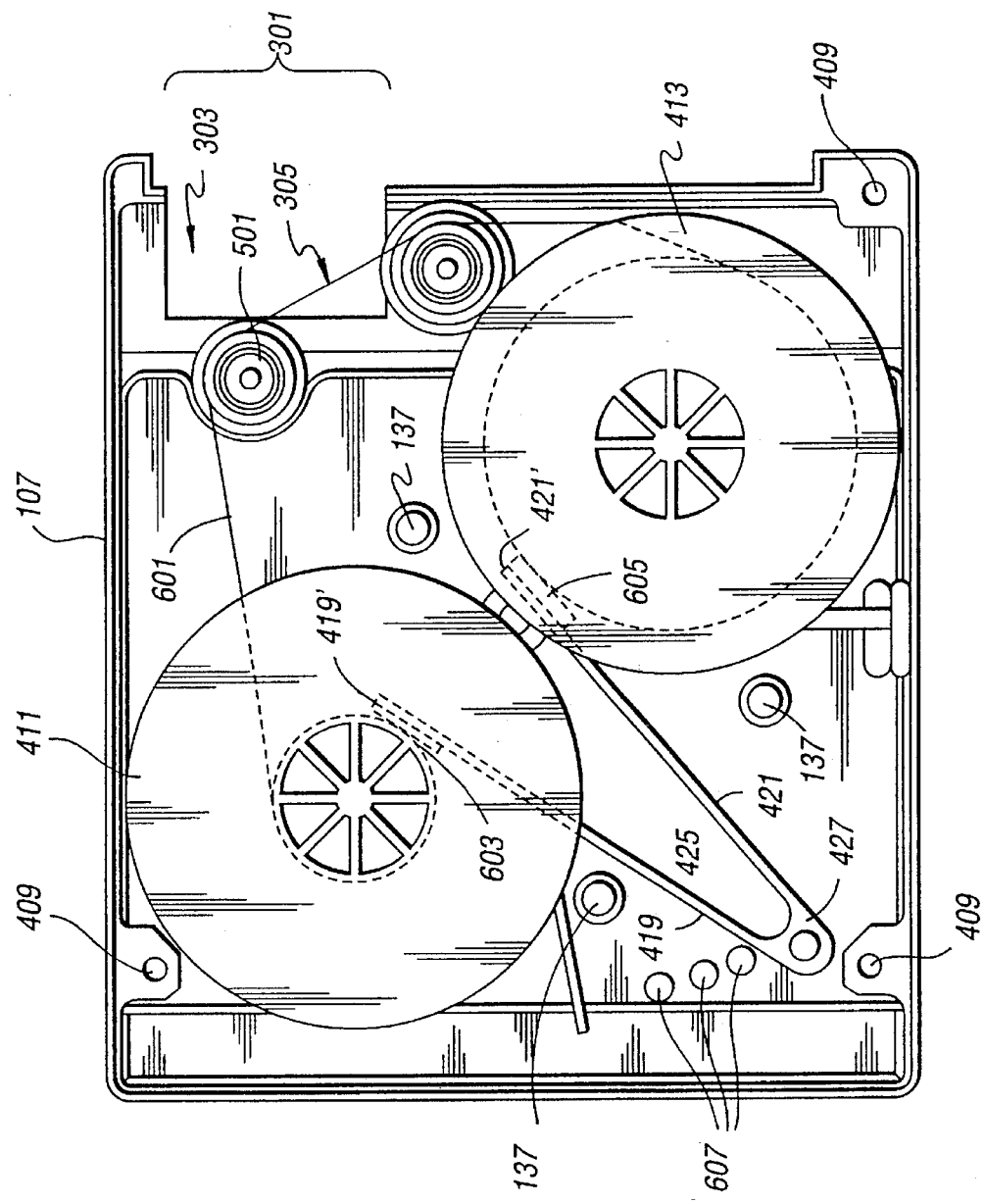
FIG. 6 is a plan view (top) of the present invention as shown in FIG. 5 with a tape medium in place (in partial hidden view depiction).

As shown similarly in FIG. 5 in which the sliding door 123 has been removed, in the region of the central cavity 401 nearest the access port 303, two tape guides 501, 503 are affixed such that the tape medium in a path between the two spools 411, 413 is wrapped about the tape guides 501, 503 and a tape segment 305 is presented at the access port 303 (see FIGS. 3 and 6). Tape guides 501, 503 are known in the art, thus need no further explanation here. The tape guides 501, 503 are positioned in accordance with the design of the tape drive system and recording head mechanism such that the media wrap angle across the recording head is appropriate in accordance with respective design specification criteria when the cassette 101 is fully inserted into the tape drive system. The wrap angle is generally less than 180-degrees.

In its fully assembled form and with the sliding door 123 closed, the cassette 101 central cavity 401 is substantially sealed from contaminants. However, as is known in the art, performance at the tape to recording head interface is extremely sensitive to even minute particulate contaminants. As shown in FIG. 2, tape spool wells 215, 217 necessary to mate the supply spools 411, 413 to a tape transport mechanism of the tape drive system and the cutout section 301 provide another access for dust particles and the like as does the access port 303 when the sliding door 123 is open (however, in the present invention, the door 123 is opened only after being inserted into the tape drive system rather than in an open environment, thus reducing the risk of the introduction of contaminants into the cassette 101). Therefore, it is beneficial to clean the tape before it contacts the recording head. Moreover, as the tape path will remain internal to the cassette 101, tape cleaning mechanisms which have been developed to work with tape drive systems which extract the tape from its container are unsuited. Therefore, it has been found to be advantageous to provide a tape cleaning mechanism 415 entirely internal to the cassette 101 as shown in FIGS. 4, 5 and 6.

The tape cleaning mechanism 415 has a forked, V-shaped, resilient member 417 provided with an appropriate angle such that its forked arm portions 419, 421 extend to have their respective distal ends captured loosely between the flanges 412, 412', 414, 414' of the tape spools 411, 413. The V-shaped resilient member 417 is mounted for pivotal motion on a post 423 affixed to the shell bottom 107. The post 423 has a portion 425 sized and shaped to receive the V-shaped resilient member 417 loosely thereon by providing a post receiving aperture 427 in the apex of the V-shape. Thus, the V-shaped resilient member 417 is free to pivot about the post 423.

As best demonstrated in FIG. 6, a tape medium 601 is wrapped around media supply and take-up spools, that is, reeled from one spool 411 to the other spool 413 around the tape guides 501, 503 and, in the process, present a tape segment 305 to the access port 303 of the cassette 101. As is known in the art, a magnetic recording tape 601 has a base film (generally a plastic substrate material used for support)

and a coating (such as oxide particles held in a binder that is applied to the base film) in which the data is recorded. With this internal tape path configuration, the recording face of the magnetic tape faces outwardly from the spools so as to be in appropriate recording orientation as it is passed over the recording head at the segment 305 between the tape guides 501, 503. The ends 419', 421' of the resilient member arms 419, 421 each have a cleaning pad 603, 605 adhered thereto. Each pad 603, 605 is in contact with a segment of the recording tape wrapped about the spools 411, 413. The pads 603, 605 are made, for example, of a porous fabric material suited to wipe the tape surface. As the media reels from one spool to the other, the resilient member 417 pivots and follows the changing diameter of the tape supply on the spools 411, 413. This allows the cleaning of the tape both prior to read/write functions at the recording head and after the head interface as it is wrapped around the take-up spool and during very high speed operations such as in executing REWIND and FILE SEARCH commands. As the cassette may be adapted to bidirectional recording, a pad 603, 605 on each arm 419, 421 ensures appropriate cleaning.

Figure 7:
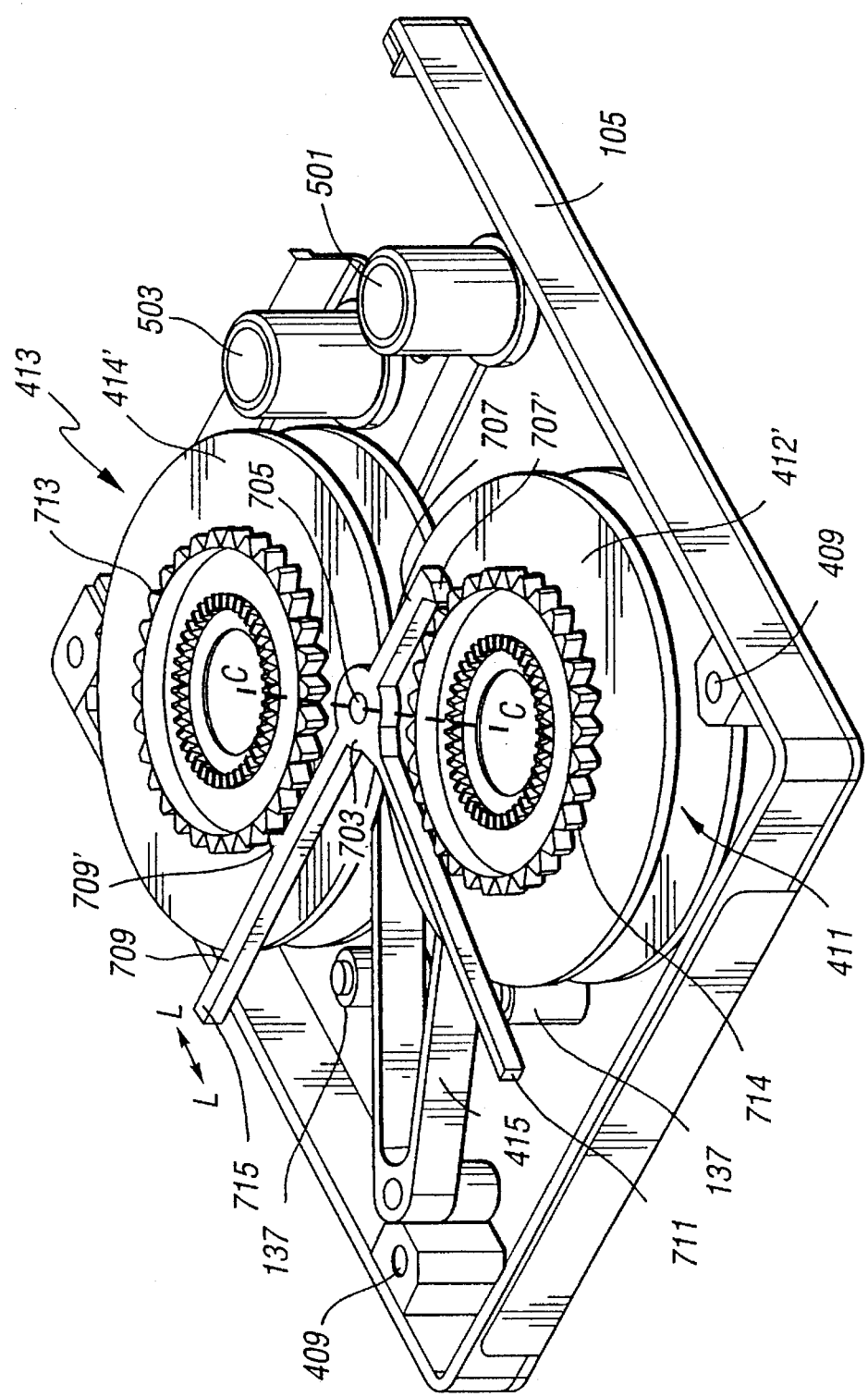
FIG. 7 is a plan view (bottom) of the present invention as shown in FIG. 6 with the tape, shell casing bottom half, and sliding door feature removed.
Figure 8:
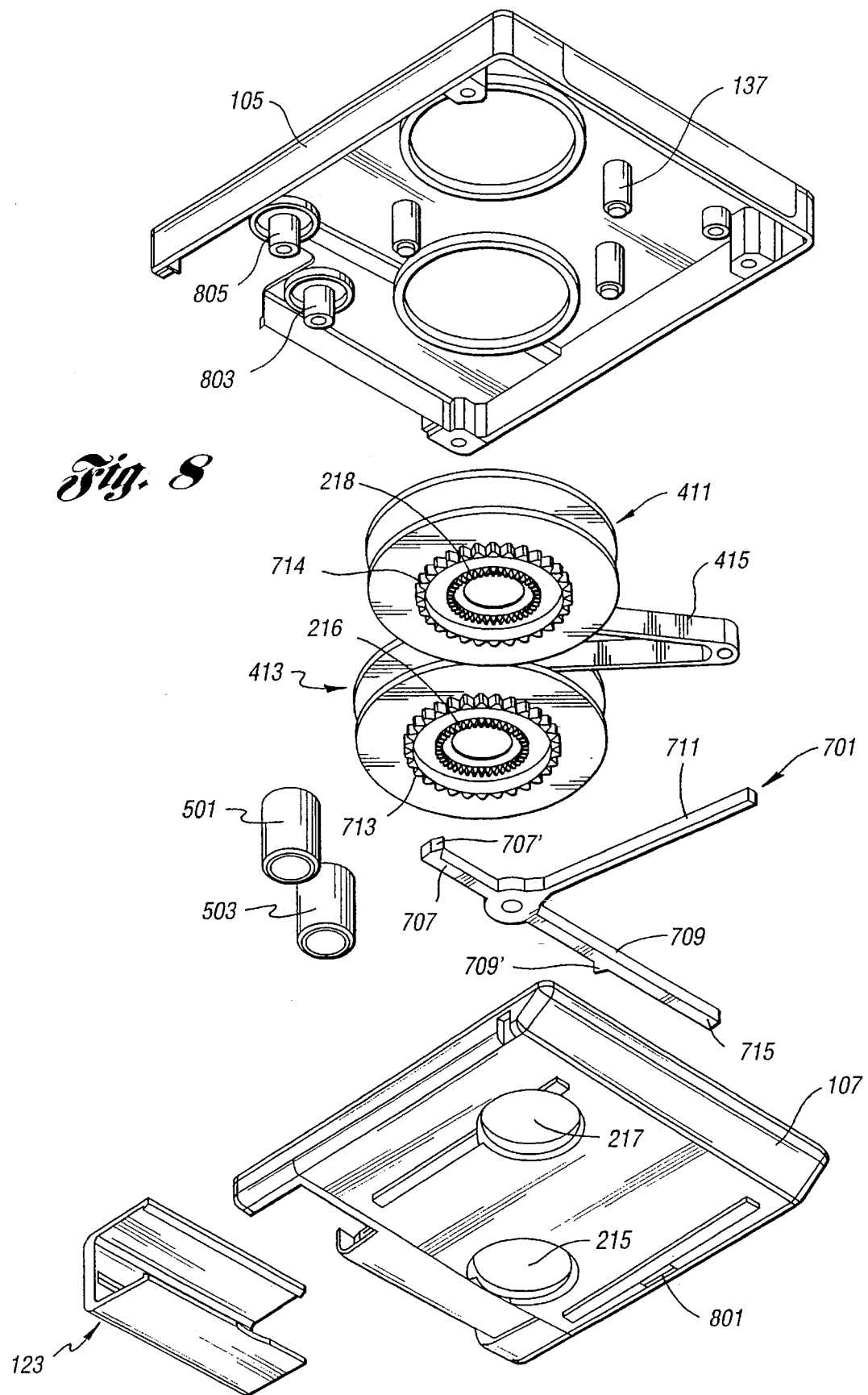
FIG. 8 is an exploded perspective view of the present invention.

Because of the necessary freedom of motion inherent in the use of two spools 411, 413, maintaining accurate, repeatable alignment with the recording head is an important issue. In optimized recording systems, it is advantageous to not have to rewind the tape each time the tape cassette is to be removed from the drive. For example, if a particular tape is used to archive digital data from a computer main memory on a regular basis, time and mechanism wear is saved if the tape can merely be ejected following a data back-up cycle where the last data file ends rather than fully rewinding the tape. At the next backup session, the drive is free from having to perform a FILE SEARCH routine to begin the next data set. However, as the components of the cassette 101 are relatively loose fitting, handling of the cassette 101 between recording can result in a subsequent misalignment of the tape to recording head interface. Therefore, a spool locking device is provided as shown in FIG. 7 and FIG. 8. The shell bottom half 107 and door 123 have been removed in this depiction.

The spool locking device is provided in the form of a spring loaded, double pawl 701. The pawl 701 has a central pivot portion 703 located for allowing rotation of the locking device about its pivot point. The pivot may be as simple as providing a pivot post 705 rising from the floor of the shell bottom 107 and an aperture in the pawl 701 for receiving the post 705. Generally, the pivot portion 703 is located approximately half way between the tape spool wells 215, 217 along a straight line connecting their centers (line C—C). Three arm members 707, 709, 711 extend radially from the pivot portion 703. Two arm members 707, 709 extend in opposite radial directions from the pivot 703 and transect the line C—C connecting the well centers. Each of those arm members 707, 709 bear a tongue 707', 709'. The tongues 707', 709' are located an appropriate distance from the pivot 703 at a position adjacent the tape spool wells 215, 217. One arm member 709 extends beyond the tongue 709' to a radial extremity from the pivot 703. This extremity acts as a locking device actuator 715.

In the preferred embodiment, the locking device is adapted tbr automated locking and unlocking. When the cassette 101 is inserted, a locking device activator (not shown) associated with the tape drive system is engaged with the locking device 701 by interfacing with the actuator arm 715 through an access hole 801 in the shell bottom 107 (see also FIG. 2). The locking device 701 is disengaged when the cassette 101 is fully inserted into the tape drive system. By this design, there is no relative motion or drag between the spools and the cassette locking device during operation and higher operating and fast winding speeds are permitted.

It will be recognized by those skilled in the art that the locking device 701 can also be adapted as a manually activated lock.

Each spool 411, 413 bears a spur gear 713, 714 beneath its respective spool lower flange 412', 414'. Appropriate clearances are provided as needed in the shell construction to accommodate the spur gears 713, 714. The locking device 701 is provided sufficient freedom of motion in order to have the tongues 707', 709' engage respective spur gears 713, 714 when the pawl 701 is shifted about the pivot 703 and to fully disengage the spur gears 713, 714 when the cassette 101 is inserted into a compatible drive (as represented by arrow "L—L" as shown in FIG. 7).

A third arm member 711 extends radially from the pivot 703 and is adapted to exert a spring force on the pawl 701 to bias the tongues 707', 709' into the engaged lock position. The third arm member 711 is designed to bend and snap fit with locking posts 607 of shell bottom 107 when the cassette 101 is released from the tape drive transport. In this configuration, both spools 411, 413 are locked simultaneously.

FIG. 8 shows the cassette 101 and its components in an exploded view. Tape guide mounts 803 and 805 are provided to locate and support the tape guides 501, 503.

The preferred embodiment of the present invention as described permits the design of a small, high performance tape drive which will be substantially compatible with current tape library machines such as the model 4400 ACS by Storage Technology, Louisville, Conn. Improved performance will be effected by this self-contained cassette design in which contamination and tape to recording head interface alignment problems have been substantially diminished.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A tape cassette for use with an operatively compatible tape drive having a tape reeling mechanism, comprising:

a shell having external dimensions conforming to automated tape handling apparatus for 3480/3490 magnetic tape cartridges and a central cavity with a pair of tape spool access wells adapted to receive a coupling from said tape reeling mechanism;

a tape supply spool mounted with respect to one of said tape spool access wells for rotation within said central cavity and adapted to engage said coupling of said tape reeling mechanism;

a tape take-up spool mounted with respect to another one of said tape spool access wells for rotation within said central cavity and adapted to engage said coupling of said tape reeling mechanism;

a length of magnetic tape having its extreme ends coupled to each said spool respectively and a magnetic coating side facing outwardly from each said spool;

a tape cleaning device including a pivot fixedly mounted within said cavity, a forked member, mounted for rotation about said pivot, having a first fork extending from said pivot to a region between flanges of said supply spool and a second fork extending from said pivot to a region between flanges of said take-up spool, and a pair of cleaning pads respectively adhered to each said first and second fork and adapted to wipe a segment of said magnetic coating side of said tape as said tape is reeled from spool to spool; and a spool locking device including
i. engaging means, mounted with said cassette, for selectively engaging each of said spools;
ii. shifting means, integrated with said engaging means, for shifting said engaging means from a first predetermined position in which said spools are locked to a second predetermined position in which said spools are unconstrained; and
iii. receiving means, respectively associated with each said spool, for receiving said engaging means.

2. The device as set forth in claim 1, wherein said locking device further comprises:

biasing means, coupled to said engaging means, for biasing said engaging means toward said first predetermined position when said cassette is removed from said tape transport mechanism.

3. A recording tape cassette apparatus, comprising:

a shell means for enclosing a central cavity;

access means, slidingly mounted on said shell means, for providing acess to said cavity and adapted for receiving a recording head means therein;

a tape supply spool, a tape take-up spool, a supply of recording tape coupled at each end to a spool, and spool driving means associated with each said spool for coupling each said spool to a tape transport mechanism, all contained within said central cavity;

guide means, mounted within said cavity, for guiding a segment of said recording tape past said access means in a predetermined alignment with said recording head means;

locking means, mounted within said cavity, for selectively locking and unlocking both said spool supply and said take-up spool;

following means, mounted with respect to said shell, having a pair of members each respectively associated with one of said spool, for following a respective segment of said tape on each said spool in order to maintain a relative adjacent position with respect to a segment of said tape associated with each said spool as said tape is wound between spools; and, wiping means, respectively coupled to each said following means and abutting said segment of said tape for removing contaminants from said tape.

4. The apparatus as set forth in claim 3, wherein said following means comprises:

a pivot fixedly mounted within said cavity;

a forked device, mounted for rotation about said pivot, having a fork extending from said pivot to a region between flanges of said supply and a fork extending from said pivot to a region between flanges of said take-up spool.

5. A recording tape cassette for use with an operatively compatible tape drive having a tape reeling mechanism, comprising:

a shell defining a central cavity and having first and second tape spool access wells adapted to receive said tape reeling mechanism therein;

a tape supply spool mounted with respect to said first tape spool access well for rotation within said central cavity and adapted to engage with said tape reeling mechanism;

a tape take-up spool mounted with respect to said second tape spool access well for rotation within said central cavity and adapted to engage with said tape reeling mechanism;

a length of magnetic tape having its extreme ends coupled to each said spool respectively;

a pivot fixed mounted with said central cavity;

a forked member, mounted for rotation on said pivot, having a first and second diverging fork such that said first diverging fork extends from said pivot to a position in proximity to said supply spool and said second diverging fork extends from said pivot to a position in proximity to said take-up spool;

a first wiping means, adhered to said first diverging fork;

a second wiping means adhered to said second diverging fork, such that said first and second wiping means each contact a segment of said length of magnetic tape on said supply spool and said take-up spool, respectively; and, a locking device operatively associated with each said spool adapted to restrain said spools in the same orientation as when said cassette is released from said tape drive.

* * * * *